April 26, 1966   D. GREEN   3,247,693
MANUFACTURE OF NUCLEAR REACTOR FUEL ELEMENTS
Filed Dec. 27, 1961
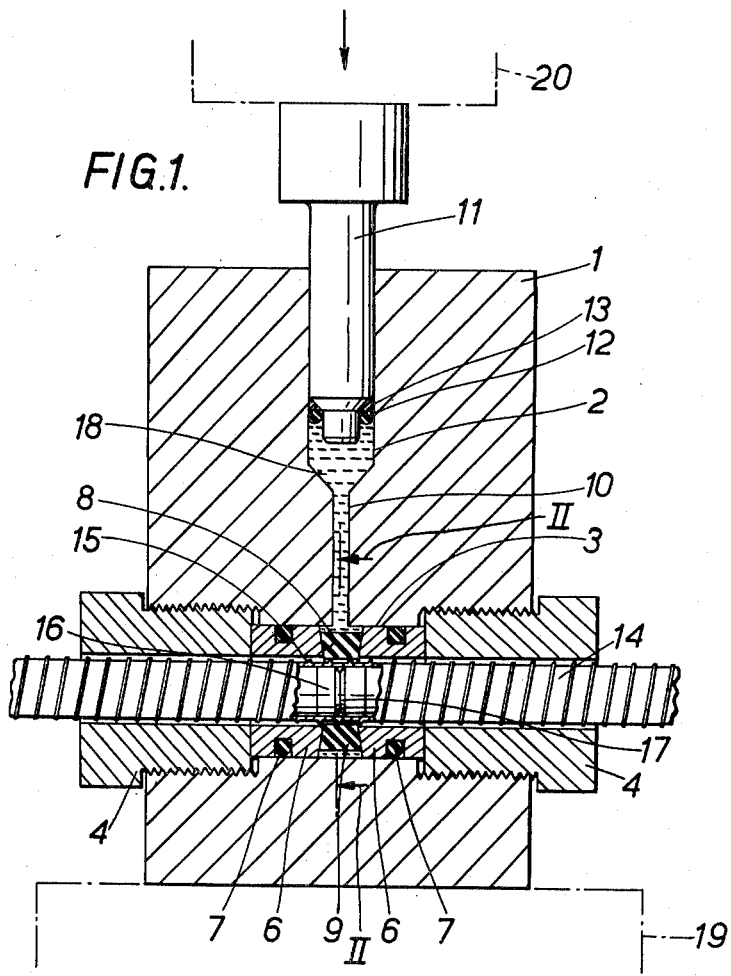
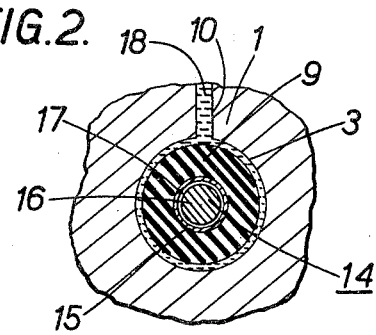

United States Patent Office 3,247,693
Patented Apr. 26, 1966

3,247,693
MANUFACTURE OF NUCLEAR REACTOR
FUEL ELEMENTS
Derek Green, Lytham St. Annes, England, assignor to United Kingdom Atomic Energy Authority, London, England
Filed Dec. 27, 1961, Ser. No. 162,456
Claims priority, application Great Britain, Dec. 29, 1960, 44,684/60
2 Claims. (Cl. 72—54)

This invention relates to the manufacture of nuclear reactor fuel elements.

It has been proposed as a step in the manufacture of nuclear reactor fuel elements to subject the fuel elements to fluid pressurisation in order to form the fuel element sheaths into intimate contact with fuel members contained in the sheaths and also to form the sheaths into engagement with circumferential grooves around the fuel members.

However in the case of the type of fuel element comprising a thin walled sheath containing pellets of sintered uranium dioxide as fuel, it has been found that the application of overall pressurisation, to form the sheath into intimate contact with the fuel pellets and to form the sheath into engagement with circumferential grooves around the fuel pellets, results in distortion of the fuel element.

The present invention is based on the discovery that the axial component of compression present in fluid pressurisation can cause edge or corner failure of the pellets (especially where the pellets have concave or dished ends) with resulting distortion of the fuel element. To avoid this situation the sheath of a fuel element is, in accordance with the invention subjected to compressive pressure free from axial compressive pressure to form the sheath into intimate contact with fuel members contained in the sheath.

In one form of equiment, embodying the invention, localised radial compression is applied to the sheath of a fuel element through an elastically compressible ring which embraces the fuel element sheath and the ring is compressed under the action of pressurised hydraulic fluid applied to the outer circumference of the rings.

An embodiment of the invention will now be described by way of example with reference to the accompanying drawings in which:

FIG. 1 is a sectional elevation of one embodiment of the invention.

FIG. 2 is a sectional detail along the line II—II in FIG. 1.

The embodiment of the invention shown in FIGS. 1 and 2 comprises a cylinder block 1 having a perpendicular bore 2 and a horizontal bore 3. The horizontal bore 3 is threaded either end to fit gland nuts 4. Each gland nut 4 retains a gland ring 6 in the horizontal bore 3, the gland rings 6 being circumferentially grooved to accommodate O-ring seals 7. The inner end face 8 of each gland ring 6 is of slightly conical form and an annular rubber forming ring 9 is trapped between the conical end faces 8 of the gland rings 6. The forming ring 9 has concave conical end faces to mate with the conical end faces 8 of the gland rings 6. The perpendicular bore 2 in the cylinder block 1 is connected by a small diameter passageway 10 with the horizontal bore 3 in the region of the forming ring 8. A plunger 11 which is a close fit in the perpendicular bore 2 is fitted with an O-ring seal 12 and backing ring 13.

In the use of the equipment a nuclear reactor fuel element 14 is inserted through the gland nuts 5, the gland rings 6 and the forming ring 9. The fuel element 14 comprises a thin walled sheath 15 filled with right cylindrical fuel pellets 16. The equipment is designed to apply localised radial compression to the sheath 15 of the fuel element 14 in order to form the sheath 15 into V section circumferential grooves 17 around one or more of the fuel pellets 16. As shown in the drawings the fuel element 14 is positioned so that the forming ring 9 embraces the sheath 15 in a region to be formed into the circumferential groove 17 around the underlying fuel pellet 16. The perpendicular bore 2 in the cylinder block 1 is partially filled with hydraulic fluid 18 and is sealed off by insertion of the plunger 11. Pressure is now built up in the hydraulic fluid 18 by forcing the plunger 11 down the perpendicular bore 2. This may be done by means of a simple compression machine such as is shown in chain dotted outline in FIG. 1, the machine having a base 19 on which the cylinder block 1 is supported and a ram 20 which is applied to force the plunger 11 down the perpendicular bore 2 in the cylinder block 1. The pressurised hydraulic fluid 18 acts on the outer circumferential surface of the forming ring which is thereby reduced in diameter. The ring 9 maintains a true diameter whilst being compressed because of the side restraint of the conical end faces 8 of the gland rings 6. The contact pressure between the rubber forming ring 9 and the conical end faces 8 of the gland rings 6 increases with compression of the ring 9 thus forming a pressure tight fluid seal.

The pressure is increased until the rubber forming ring 9 comes into contact with and finally forms the fuel element sheath 15 into the circumferential groove 17 around the underlying fuel pellet 16.

The internal diameter of the gland rings 6 is made only slightly greater than the diameter of the fuel element sheath 15 so as to prevent extrusion of the forming ring 9 into the annular space between the sheath 15 and the internal bore of the gland rings 6. The rubber forming ring 9 has a bore about 25% greater in diameter than the diameter of the fuel element sheath 15 and an external diameter slightly less than the diameter of the bore 3. In order to ensure that the forming ring 9 remains undistorted in cross section and maintains an effective seal on both side faces, the outer circumferential face width of the ring 9 should not be greater than the annular dimensions between the inner bore surface and the outer circumferential face of the ring 9.

Alternative to the use of a compression machine for the application of pressure an intensifier type pump can be used supplying several sets of equipment.

In the embodiment described above the fuel element sheath is merely subjected to radial compression and the application of axial compression is obviated. Obviation of the application of axial compression to the fuel element sheath removes the cause of bending of such fuel elements which occurs when the fuel elements are subjected directly to the action of hydraulic fluid under pressure. In the embodiment of FIGS. 1 and 2 it is readily apparent that the fuel element sheath is merely subjected to localised radial compression.

I claim:

1. Apparatus for inwardly deforming a circumferential band of a tubular nuclear reactor fuel element sheath into engagement with a circumferential groove around a cylindrical member contained within the fuel element sheath, comprising: a pressure resistant housing having a passageway therethrough to receive and proportioned to fit snugly about a fuel element sheath; and annular pocket around and opening inwardly at an annular mouth to said passageway, the walls of the annular pocket in cross section tapering outwardly from the annular mouth of the pocket; means for exerting an inwardly acting deforming pressure on the region of the fuel element sheath surrounded by the mouth of the annular pocket when the fuel element sheath is inserted in the passageway in the housing comprising an elastically compressible annular ring in said annular pocket, at least a portion of the cross-sectional area of said elastically compressible ring being of greater longitudinal dimensions than the longitudinal width of said annular mouth, means for pressurizing hydraulic fluid in said annular pocket to act on the outer periphery of the elastically compressible annular ring and compress the ring radially inwards onto the fuel element sheath in the region to be deformed, the annular ring sealing on the walls of the pocket which taper outwardly from the annular mouth of the pocket, the contact pressure between the ring and said walls increasing with increase of pressure in the hydraulic fluid to form a pressure tight fluid seal.

2. Apparatus as recited in claim 1 wherein at least a portion of at least one of the lateral walls of said elastically compressible ring which are adjacent to the tapered walls of said annular pocket is tapered in substantially the same direction as the walls of said annular pocket are tapered.

References Cited by the Examiner

UNITED STATES PATENTS

| | | | |
|---|---|---|---|
| 605,195 | 6/1898 | Birtwisle | 153—73 |
| 2,326,990 | 8/1943 | Woodson | 153—73 |
| 2,375,574 | 5/1945 | Metheny et al. | 153—1 |
| 2,381,747 | 8/1945 | Howe | 153—1 |
| 2,423,862 | 7/1947 | Vorobik | 153—1 |

CHARLES W. LANHAM, *Primary Examiner.*